(12) United States Patent
Huang (10) Patent No.: US 11,380,071 B2
(45) Date of Patent: Jul. 5, 2022

(54) AUGMENTED REALITY SYSTEM AND DISPLAY METHOD FOR ANCHORING VIRTUAL OBJECT THEREOF

(71) Applicant: Acer Incorporated, New Taipei (TW)

(72) Inventor: Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/125,884

(22) Filed: Dec. 17, 2020

(65) Prior Publication Data
US 2022/0058877 A1 Feb. 24, 2022

(30) Foreign Application Priority Data
Aug. 21, 2020 (TW) .................................. 109128636

(51) Int. Cl.
| | |
|---|---|
| G06T 19/00 | (2011.01) |
| G06F 17/18 | (2006.01) |
| G02B 27/00 | (2006.01) |
| G06F 3/04815 | (2022.01) |

(52) U.S. Cl.
CPC ........ *G06T 19/006* (2013.01); *G02B 27/0093* (2013.01); *G06F 3/04815* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 2020/0111256 A1* | 4/2020 | Bleyer | ................ G06F 3/04815 |
| 2021/0133991 A1* | 5/2021 | Tamama | ................. G06F 9/544 |

FOREIGN PATENT DOCUMENTS

| | | |
|---|---|---|
| TW | 201631960 | 9/2016 |
| TW | 202001686 | 1/2020 |

\* cited by examiner

*Primary Examiner* — Nicholas R Wilson
(74) *Attorney, Agent, or Firm* — JCIPRNET (57) ABSTRACT

An augmented reality system and a display method for anchoring a virtual object thereof are provided. An image sequence is captured from an electronic equipment through an image capturing device on a head-mounted device. The image sequence includes an $i^{th}$ and an $(i+1)^{th}$ environmental image. The electronic equipment includes a component device. A feature matching operation is performed on the $i^{th}$ environmental image and a first template image to obtain a matching result. In response to the matching result meeting a preset condition, a second template image extending from a matching image block of the component device is captured from the $i^{th}$ environmental image. A feature matching operation is performed on the $(i+1)^{th}$ environmental image and the second template image to display a virtual object through the head-mounted device according to another matching result. The virtual object is displayed as being anchored to the electronic equipment in a real scene.

20 Claims, 7 Drawing Sheets

AUGMENTED REALITY SYSTEM AND DISPLAY METHOD FOR ANCHORING VIRTUAL OBJECT THEREOF

CROSS-REFERENCE TO RELATED APPLICATION

This application claims the priority benefit of Taiwan application serial no. 109128636, filed on Aug. 21, 2020. The entirety of the above-mentioned patent application is hereby incorporated by reference herein and made a part of this specification.

BACKGROUND

1. Technical Field

The disclosure relates to an augmented reality device, and particularly relates to an augmented reality system and a display method for anchoring a virtual object thereof.

2. Description of Related Art

With the development of technology, the Augmented Reality (AR) technology is increasingly used, and AR technology applies virtual information to the real world.

On the other hand, as the amount of information processing increases, single-screen notebook computers are no longer sufficient to meet the needs of workers. Typically, users in the office can connect their notebook computers to another desktop monitor to use the multi-screen display to increase productivity. However, users who work outside the office are unable to carry a large desktop monitor with them, making it hard for them to enjoy the convenience of a multi-screen display.

SUMMARY

In view of this, the disclosure provides an augmented reality system and a display method for anchoring a virtual object, capable of displaying through a head-mounted display a virtual object that uses an electronic device in a real scene as an anchor point.

The embodiments of the disclosure provide a display method for anchoring a virtual object in an augmented reality system, including following steps: capturing an image sequence from an electronic equipment through an image capturing device disposed on a head-mounted display, where the image sequence includes an $i^{th}$ environmental image and an $(i+1)^{th}$ environmental image, and the electronic equipment includes a component device; performing a feature matching operation on the $i^{th}$ environmental image and a first template image to obtain a matching result, where the first template image includes an image of the component device; in response to the matching result meeting a preset condition, capturing from the $i^{th}$ environmental image a second template image that extends from a matching image block of the component device, where the first template image is different from the second template image; and performing a feature matching operation on the $(i+1)^{th}$ environmental image and the second template image to obtain another matching result, so as to display at a current time point a virtual object through the head-mounted display according to the another matching result, where the virtual object is displayed as being anchored to the electronic equipment in a real scene.

The embodiments of the disclosure provide an augmented reality system, including a head-mounted display and a computer device. A head-mounted display includes an image capturing device and displays a virtual object. The image capturing device captures from an electronic equipment device an image sequence. The image sequence includes an $i^{th}$ environmental image and an $(i+1)^{th}$ environmental image, and the electronic equipment includes a component device. A computer device is connected to the head-mounted display, and includes a storage device and a processor. The processor is configured to perform following steps: performing a feature matching operation on the $i^{th}$ environmental image and a first template image to obtain a matching result, where the first template image includes an image of the component device; in response to the matching result meeting a preset condition, capturing from the $i^{th}$ environmental image a second template image that extends from a matching image block of the component device, where the first template image is different from the second template image; and performing the feature matching operation on the $(i+1)^{th}$ environmental image and the second template image to obtain another matching result, so as to control the head-mounted display according to the another matching result to display a virtual object, where the virtual object is displayed as being anchored to the electronic equipment in a real scene.

Based on the above, in the embodiments of the disclosure, by performing feature matching operations on the environmental image and the template image, positioning information of the component device of the electronic equipment of the environmental image may be obtained, and then the display position of the virtual object may be determined. In this way, the template image may be determined based on the real scene around the electronic equipment, thereby improving the accuracy and robustness of the feature matching. Accordingly, the user can view through the head-mounted display the virtual object shown robustly and accurately around the electronic equipment, where the virtual object is displayed as being anchored in a fixed position, such that the viewing experience of the user viewing a virtual object is enhanced.

In order to make the above-mentioned features and advantages of the disclosure more obvious and understandable, the embodiments are specifically described below in conjunction with the accompanying drawings for detailed description as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Part of the embodiments of the disclosure will be described in detail in conjunction with the accompanying views. The reference symbols in the following description will be regarded as the same or similar components when the same symbol appears in different views. These embodiments are only a part of the disclosure, and do not disclose all the possible implementation modes of the disclosure. To be more precise, these embodiments are just examples of the method and the system within the claims of the disclosure.

Figure 1A:
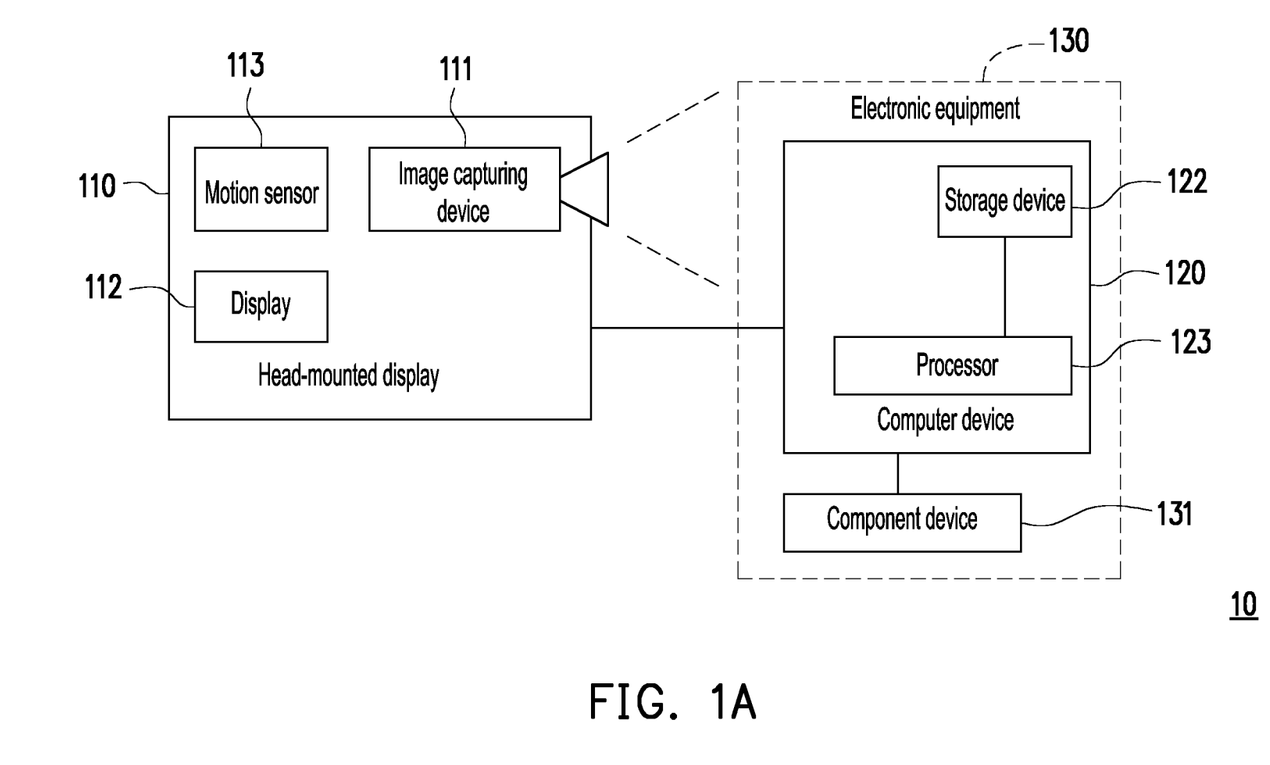
FIG. 1A is a schematic view of an augmented reality system according to one embodiment of the disclosure.
Figure 1B:
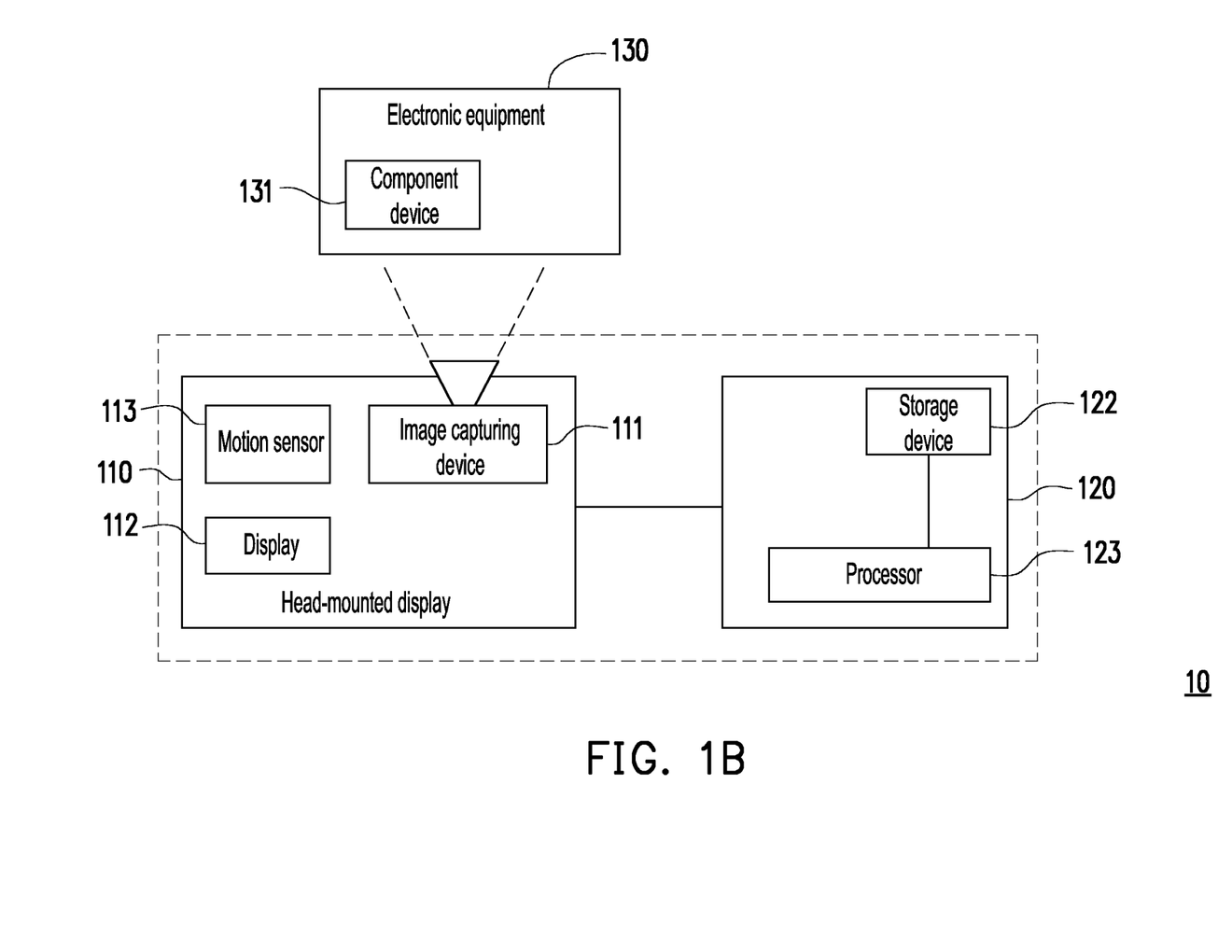
FIG. 1B is a schematic view of an augmented reality system according to one embodiment of the disclosure.

FIG. 1A is a schematic view of an augmented reality system according to one embodiment of the disclosure. FIG. 1B is a schematic view of an augmented reality system according to one embodiment of the disclosure. Please refer to FIG. 1A and FIG. 1B. An augmented reality (AR) system 10 includes a head-mounted display 110 and a computer device 120, and may be a single integrated system or a non-integrated system. Specifically, as shown in FIG. 1A, the computer device 120 may be disposed in an electronic equipment 130 and connected to the head-mounted display 110 via a wired transmission interface or a wireless transmission interface. In another embodiment, as shown in FIG. 1B, the head-mounted display 110 and the computer device 120 in the augmented reality system 10 may be implemented as an all-in-one (AIO) head-mounted display. For example, the augmented reality system 10 may be implemented as an integrated AR glasses, or as an AR glasses and a computer system interconnected via a communication interface. The augmented reality system 10 is configured to provide users with augmented reality content. The head-mounted display 110 in the augmented reality system 10 is configured to display a virtual object, and the virtual object will be displayed as being anchored to the electronic equipment 130 in a real scene.

The electronic equipment 130 is, for example, a notebook computer, a tablet computer, a smart phone, or a desktop monitor; the disclosure is not limited thereto. The electronic equipment 130 may include a component device 131. The component device 131 may be a keyboard, a display screen, or other components suitable for being captured by an image capturing device 111 disposed on the head-mounted display 110. In one embodiment, when a user wears the head-mounted display 110 to view the display screen of the electronic equipment 130 in the real scene, the virtual object provided by the augmented reality system 10 may be used as an auxiliary screen.

The head-mounted display 110 includes the image capturing device 111, a display 112, and a motion sensor 113. The image capturing device 111 is configured to capture an environmental image and includes a camera having a lens and a photosensitive element. The photosensitive element is configured to sense an intensity of light entering the lens, thereby generating an image. The photosensitive element may be, for example, a charge coupled device (CCD), a complementary metal-oxide semiconductor (CMOS), or other elements; the disclosure is not limited thereto. In one embodiment, the image capturing device 111 is fixedly disposed on the head-mounted display 110 and is configured to capture the real scene in front of the head-mounted display 110. For example, when the user wears the head-mounted display 110, the image capturing device 111 may be located between the user's eyes or located outside of an eye to capture the real scene that is in front of the user.

The display 112 is a display with a certain degree of light penetration; when viewed by the user, the real scene on the other side of the user may be presented. The display 112 may display the virtual object by display technologies such as liquid crystal, organic light-emitting diodes, electronic ink, or projection, and has a translucent or transparent optical lens. Therefore, the content seen by the user through the display 112 will be an augmented reality scene with the virtual object superimposed. In one embodiment, the display 112 may be implemented as a lens for the augmented reality glasses.

The motion sensor 113 is, for example, a six-axis sensor (which may sense direction and acceleration), and the types of sensors that may be used include a gravity sensor (g-sensor), a gyroscope, an accelerometer, an electronic compass, other suitable motion sensors, or a combination of the above sensors.

However, in addition to the image capturing device 111, the display 112, and the motion sensor 113, the head-mounted 110 may also include components not shown in FIG. 1, such as speakers, controllers, and various communication interfaces and the like; the disclosure is not limited thereto.

On the other hand, the computer device 120 may include a storage device 122 and a processor 123. The storage device 122 is configured to store data and program codes (such as operating system, applications, drivers) for the processor 123 to access, and may be, for example, any type of fixed or removable random access memory (RAM), read-only memory (ROM), flash memory, or a combination thereof.

The processor 123 is coupled to the storage device 122, and may be, for example, a central processing unit (CPU), an application processor (AP), other programmable general-purpose or special-purpose microprocessors, a digital signal processor (DSP), an image signal processor (ISP), a graphics processing unit (GPU), other similar devices, integrated circuits, or a combination thereof. The processor 123 may access and execute the program codes and software components recorded in the storage device 122, so as to implement the display method for anchoring the virtual object of the embodiments of the disclosure.

Figure 2:
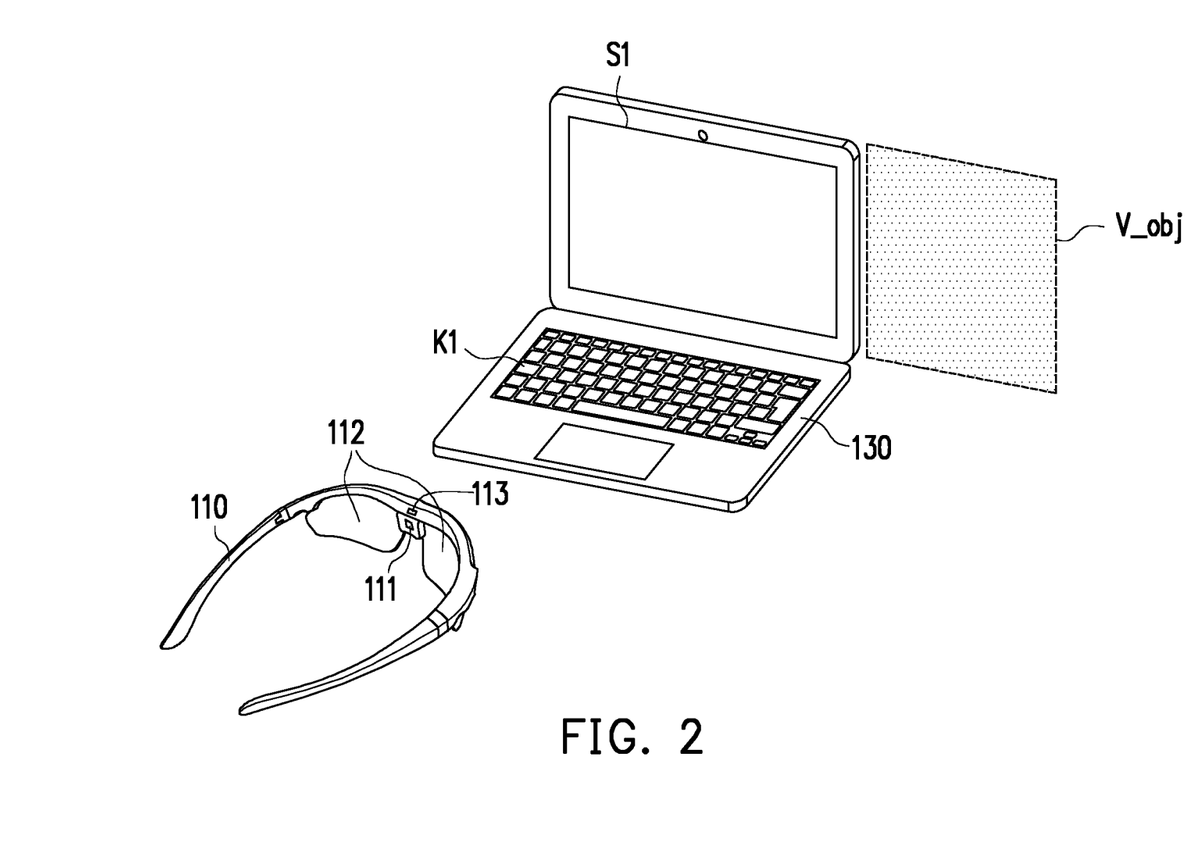
FIG. 2 is a view of an application scenario of an augmented reality system according to one embodiment of the disclosure.

FIG. 2 is a view of an application scenario of an augmented reality system according to one embodiment of the disclosure. Referring to FIG. 2, when the user views the electronic equipment 130 through the display 112 disposed on the head-mounted display 110, the user can see the augmented reality scene where a virtual object V_obj is superimposed on the real scene. In detail, when the user operates the electronic equipment 130 while wearing the head-mounted display 110, the image capturing device 111 captures from the electronic equipment 130 an image sequence including multiple environmental images. The computer device 120 may position the electronic equipment 130 in real-time based on the environmental images, and, according to the positioning result, determine a display parameter of the virtual object V_obj, such as display boundary, display size, or display position, such that the virtual object V_obj may appear to be anchored to the electronic equipment 130. That is, even when the user moves or turns his head, through the head-mounted display 110, the user can still see the virtual object V_obj at a fixed position in the real scene. In other words, the virtual object V_obj displayed by the display 112 will relatively move as the user moves or turns his head.

As shown in the example of FIG. 2, when the user views the electronic equipment 130 through the display 112 disposed on the head-mounted 110, the user can see the virtual object V_obj that expands outward from a right display bezel of the electronic equipment 130. The virtual object V_obj may be configured to provide various types of information to the user, such as windows, documents, images, desktops or visual output generated by running applications. Therefore, the user can enjoy the convenience of the multi-screen display when viewing the electronic equipment 130 through the head-mounted display 110. However, FIG. 2 is only an exemplary illustration, and the disclosure does not limit the number of virtual objects and their display positions.

It should be noted that the image capturing device 111 may periodically and continuously capture multiple environmental images (for example, to generate the environmental images at a capture frame rate of 30 Hz), and the computer device 120 may repeatedly calculate positioning information of the electronic equipment 130 in an augmented reality coordinate system, and continuously update the display position of the virtual object accordingly. In this way, when a condition of displaying the virtual object V_obj is met, even if the user moves to another position or turns his head, the virtual object may still be displayed as being anchored in a fixed position relative to the electronic equipment 130 in the real scene.

In one embodiment, whenever the computer device 120 obtains an environmental image, the computer device 120 may obtain the positioning information of the component device 131 of the electronic equipment 130 by performing feature matching operations on the environmental image and a template image that is associated with the component device 131. Therefore, the computer device 120 may refer to the positioning information of the component device 131 to determine a display position of the virtual object V_obj in real-time. For example, the component device 131 may be a keyboard K1 or a display screen S1. It is worth mentioning that, in one embodiment, in order to ensure the robustness of the feature matching, the template image used by the computer device 120 may be dynamically changed based on the real scene information.

The following are embodiments using various components of the augmented reality system 10 to illustrate detailed steps of the display method for anchoring the virtual object.

Figure 3:
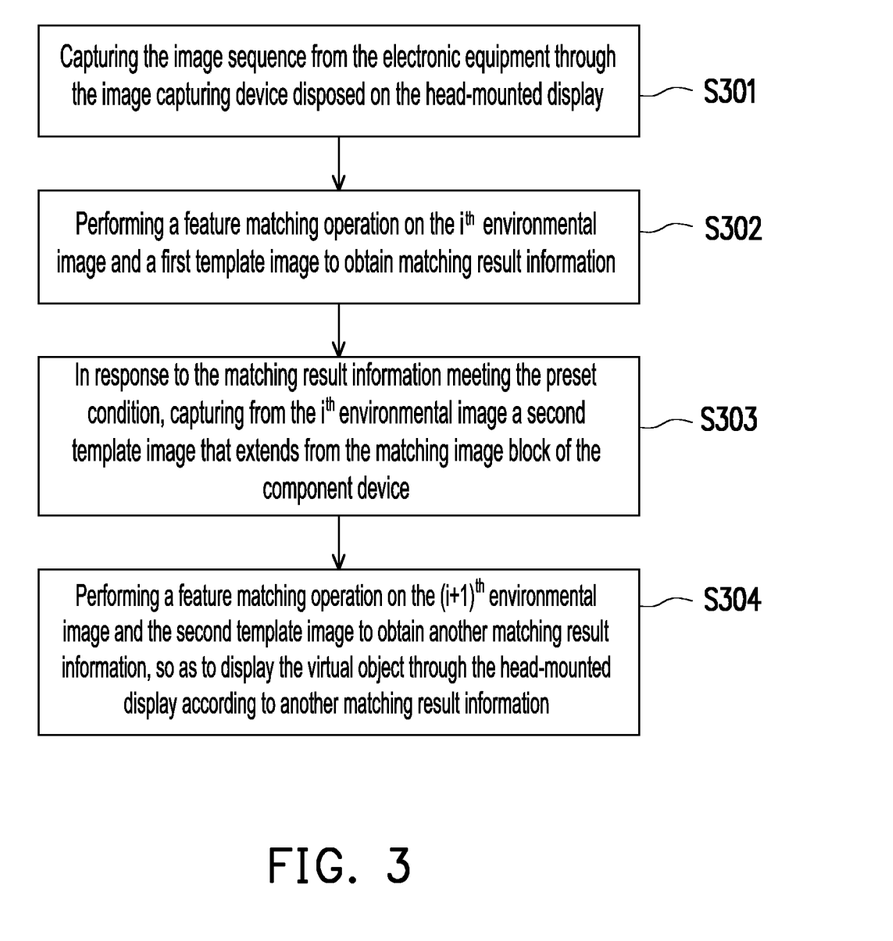
FIG. 3 is a flowchart of a display method for anchoring a virtual object according to one embodiment of the disclosure.

FIG. 3 is a flowchart of a display method for anchoring a virtual object according to one embodiment of the disclosure. Please refer to FIG. 1 and FIG. 3. The method of the present embodiment is applicable to the augmented reality system 10 in the above-mentioned embodiments. The following uses various components of the augmented reality system 10 to describe the detailed steps of the display method for anchoring the virtual object according to the present embodiment.

In step S301, the image sequence is captured from the electronic equipment 130 through the image capturing device 111 disposed on the head-mounted display 110. In one embodiment, the image capturing device 111 may continuously capture an image sequence based on a capture frame rate. The image sequence includes an $i^{th}$ environmental image and an $(i+1)^{th}$ environmental image, where i is an integer larger than 0. The multiple environmental images in the image sequence are images of the real scene around the user. In detail, the images of the real scene are associated with a field of view of the image capturing device 111.

Figure 4:
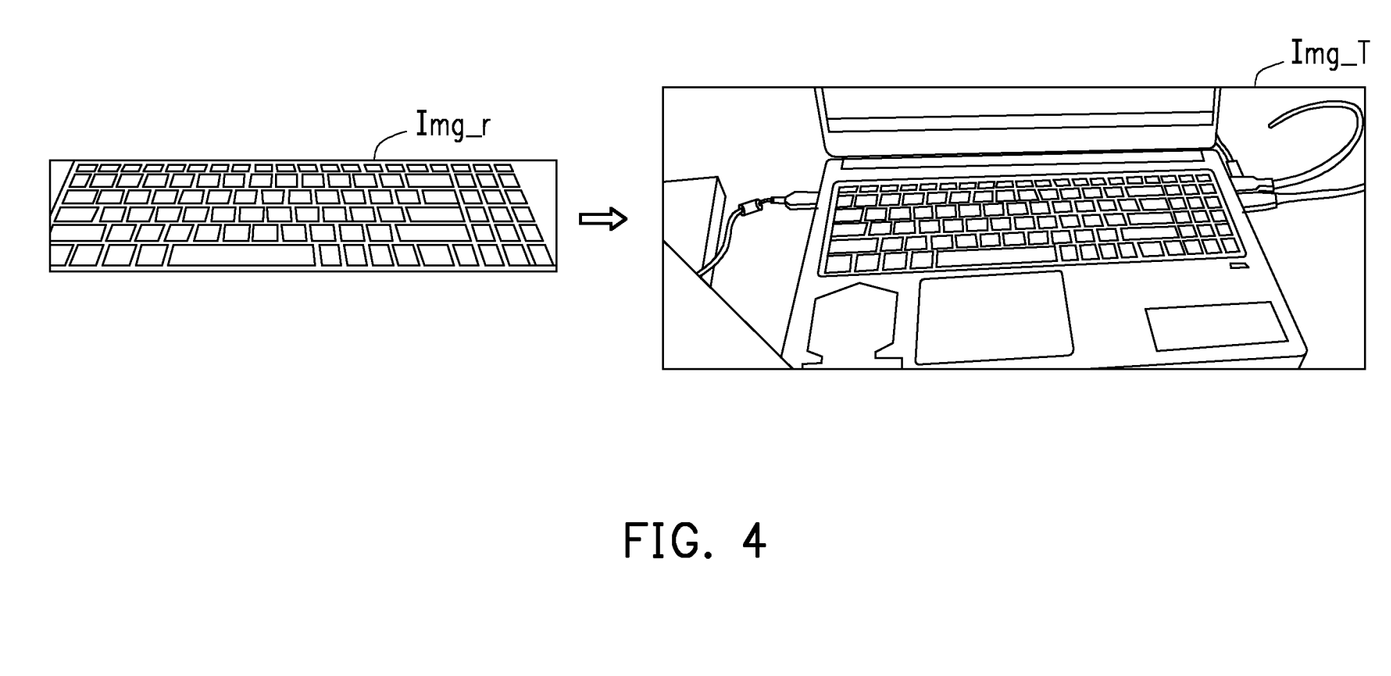
FIG. 4 is a schematic view of an example showing an original template image and a template image that is generated based on a content of a previous environmental image according to one embodiment of the disclosure.

In step S302, the processor 123 performs a feature matching operation on the $i^{th}$ environmental image and a first template image to obtain a matching result. The first template image includes an image of the component device 131. The first template image may be a preset original template image or a template image that is generated based on an image content of a previous environmental image (for example, an $(i-n)^{th}$ environmental image). For example, when i=1, it means that when the template image has not been updated according to the real scene, the first template image may be the preset original template image. The original template image may include only the image of the component device 131. When i=5, then the first template image may be a template image that is generated based on an image content of a fourth environmental image, and the template image may include the image of the component device 131 and the image of the real scene. FIG. 4 is a schematic view of an example showing an original template image and a template image that is generated based on a content of a previous environmental image according to one embodiment of the disclosure. Referring to FIG. 4, it is assumed that the component device 131 is a keyboard of the electronic equipment 130. An original template image Img_r may include only the image of the keyboard, and a template image Img_T that is generated based on the image content of the environmental image may include the image of the keyboard and the image of the real scene.

In one embodiment, the processor 123 may respectively capture image features of the $i^{th}$ environmental image and of the first template image according to a feature extraction algorithm. The feature extraction algorithm is, for example, a scale invariant feature transformation (SIFT) algorithm or a speeded up robust features (SURF) algorithm, and the like. Then, the processor 123 may perform a feature matching operation on the image features of the $i^{th}$ environmental image and the image features of the first template image to obtain the matching result. However, the disclosure does not limit the type of the feature matching algorithm. In one embodiment, the matching result may include multiple feature matching pairs, and a matching image block of the component device 131 in the $i^{th}$ environmental image. Specifically, according to the result of the feature matching operation, the processor 123 may detect from the $i^{th}$ environmental image the matching image block of the component device 131. Based on the matching image block of the component device 131 in the first template image, the processor 123 may define the matching image block of the component device 130 of the $i^{th}$ environmental image through, for example, a random sample consensus (RANSAC) algorithm. The capturing distance and capturing direction of the image capturing device 111 may affect a shape and a size of the matching image block of the $i^{th}$ environmental image.

In addition, in one embodiment, the storage device 122 may store multiple original template images, such as keyboard template images corresponding to different keyboard models. In one embodiment, the first template image in step S302 may be one of the original template images. Specifically, the processor 123 may perform feature matching operations respectively on the $i^{th}$ environmental image and the original template images. Then, according to the matching degrees respectively corresponding to the original template images, the processor 123 may select the first template image with the highest matching degree from the original template images, and then proceed with subsequent steps according to the matching result associated with the first template image.

In step S303, in response to the matching result meeting the preset condition, the processor 123 captures from the $i^{th}$ environmental image a second template image that extends from the matching image block of the component device 131. As the user's head turns or moves or the real scene changes, the first template image will be different from the second template image. In one embodiment, the size of the second template image is larger than the size of the first template image. In one embodiment, the processor 123 may determine the matching degree between the $i^{th}$ environmental image and the first template image according to the matching result. If the matching degree between the $i^{th}$ environmental image and the first template image meets the preset condition, the processor 123 may capture from the $i^{th}$ environmental image the second template image including the matching image block of the component device 131 and other real scene contents, so as to update the template image. It should be noted that in response to the matching result not meeting the preset condition, the processor 123 may remain using the first template image in subsequent operations without generating the second template image based on the $i^{th}$ environmental image. That is, in response to the matching result not meeting the preset condition, the processor 123 may remain using the first template image to position the component device 131 of the $(i+1)^{th}$ environmental image. Moreover, in one embodiment, according to the shape and position of the matching image block of the component device 131 of the $i^{th}$ environmental image, the processor 123 may also determine whether to capture the second template image from the $i^{th}$ environmental image.

Next, in step S304, the processor 123 performs a feature matching operation on the $(i+1)^{th}$ environmental image and the second template image to obtain another matching result, so as to display the virtual object through the head-mounted display 110 according to the another matching result. The operation principle of the processor 123 performing the feature matching operation on the $(i+1)^{th}$ environmental image and the second template image is the same as the operation principle performing the feature matching operation on the $i^{th}$ environmental image and the first template image, and will not be repeated here.

In one embodiment, according to the feature matching result of the $(i+1)^{th}$ environmental image and the second template image, the processor 123 may obtain another matching image block of the component device 130 from the $(i+1)^{th}$ environmental image. The another matching image block of the component device 130 obtained from the $(i+1)^{th}$ environmental image may be regarded as a positioning result of the component device 130. Thus, the processor 123 may determine the display position of the virtual object according to the image coordinate of another matching image block from the $(i+1)^{th}$ environmental image. For example, the processor 123 may use any corner point or center point of another matching image block from the $(i+1)^{th}$ environmental image as a reference anchor point to calculate the display position of the virtual object according to a preset relative position relationship. Then, the processor 123 may display the virtual object through the head-mounted display 110 according to the display position. Specifically, the processor 123 may calculate the display position of the virtual object in the camera coordinate system according to the image coordinate of another matching image block from the $(i+1)^{th}$ environmental image. Then, the processor 123 may convert the display position of the virtual object in the camera coordinate system to the display position of the virtual object in the augmented reality coordinate system according to a coordinate conversion relationship. By using a known geometric vector projection algorithm, the processor 123 may generate display data for the head-mounted display 110 according to the display position of the virtual object in the augmented reality coordinate system.

It should be noted that, in one embodiment, after step S302, the processor 123 may similarly determine the display position of the virtual object based on the matching result between the $i^{th}$ environmental image and the first template image, so as to display the virtual object through the head-mounted display 110 according to the matching result of the $i^{th}$ environmental image and the first template image. Understandably, the head-mounted display 110 first displays the virtual object based on the matching result between the $i^{th}$ environmental image and the first template image, and then displays the virtual object based on another matching result between the $(i+1)^{th}$ environmental image and the second template image. In this way, the display position of the virtual object is adjusted in real-time in response to changes in the environmental images. In other words, the virtual object seen by the user is anchored to a specific position relative to the electronic equipment 130, such that the virtual object may be integrated with the electronic equipment 130 in the real scene, thereby enhancing the visual experience and convenience.

For the convenience of description, the above embodiments are explained using two environmental images (the $i^{th}$ environmental image and the $(i+1)^{th}$ environmental image) continuously captured by the image capturing device 111. It is understandable that by repeating the process shown in FIG. 3, the template image configured to position the component device 131 may be adjusted in response to the scene change and the scene content. Therefore, in one embodiment, after the processor 123 performs the feature matching operation on the $(i+1)^{th}$ environmental image and the second template image to obtain another matching result, the processor 123 may similarly generate based on the $(i+1)^{th}$ environmental image a third template image different from the second template image according to the another matching result.

Figure 5:
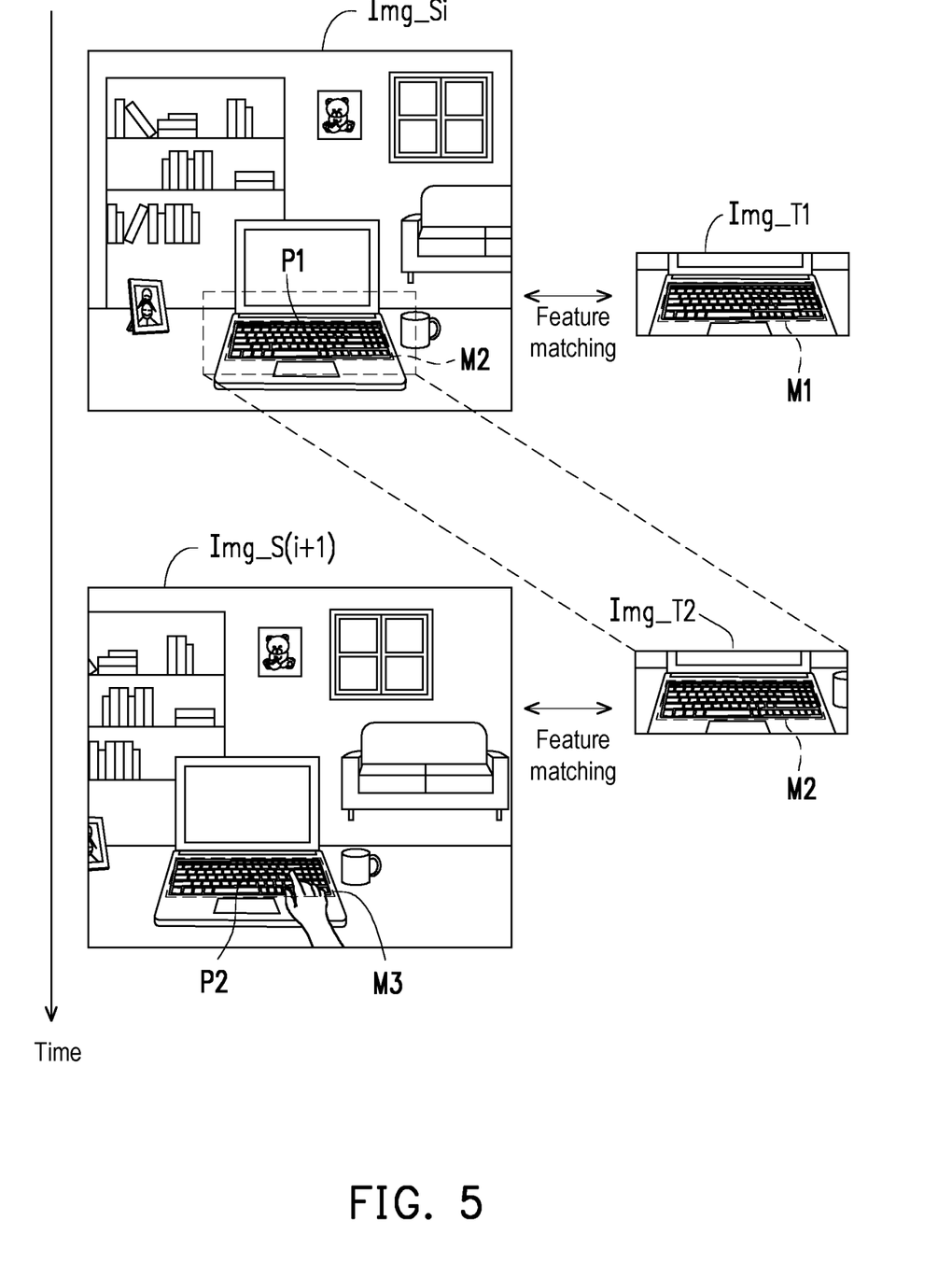
FIG. 5 is a schematic view of dynamically adjusting a template image to position a component device according to one embodiment of the disclosure.

FIG. 5 is a schematic view of dynamically adjusting a template image to position a component device according to one embodiment of the disclosure. It is assumed that the electronic equipment 130 is a notebook computer, and the component device 131 is a keyboard of the electronic equipment 130. Please refer to FIG. 5. After the image capturing device 111 captures an $i^{th}$ environmental image Img_Si, the processor 123 may perform a feature matching operation on the $i^{th}$ environmental image Img_Si and a first template image Img_T1, so as to find from the $i^{th}$ environmental image Img_Si a matching image block M2 similar to a matching image block M1 of the component device 131 of the first template image Img_T1. At a first time point, the processor 123 may determine the display position of the virtual object according to the position (for example, a center point position P1) of the matching image block M2 of the component device 131 of the $i^{th}$ environmental image Img_Si.

Moreover, if the matching degree between the $i^{th}$ environmental image Img_Si and the first template image Img_T1 meets a certain condition, the processor 123 may capture from the $i^{th}$ environmental image Img_Si the second template image Img_T2 that extends outward from the matching image block M2 of the component device 131, thereby updating the template image configured to position the component device.

Then, after obtaining an $(i+1)^{th}$ environmental image Img_S(i+1), the processor 123 performs a feature matching operation on the $(i+1)^{th}$ environmental image Img_S(i+1) and the second template image Img_T2, so as to find from the $(i+1)^{th}$ environmental image Img_S(i+1) a matching image block M3 similar to the matching image block M2 of the component device 131 of the second template image Img_T2. Therefore, at a second time point, the processor 123 may determine the display position of the virtual object according to the position (for example, a center point position P2) of the matching image block M3 of the component device 131 of the $(i+1)^{th}$ environmental image Img_S(i+1).

It is understandable that the template image used at different times will vary or extend based on the real scene, so the robustness of the feature matching can be improved. In this way, when the component device 131 is a keyboard, even if the user places his hand on the keyboard, the accuracy of the feature matching can be maintained to a certain degree. Alternatively, when the component device 131 is a display screen, even if the feature amount in the display area of the display screen is insufficient, the accuracy of the feature matching can also be maintained to a certain degree.

It is worth mentioning that, in one embodiment, when the component device 131 is a display screen, based on the time-varying data of the display area, the processor 123 may adjust the second template image according to the display area of the display screen. In other words, the display area of the display screen in the template image is determined based on the display data of the display screen of the electronic equipment 130.

In addition, in one embodiment, the motion sensor 113 may sense an acceleration of the head-mounted display 110 corresponding to three coordinate axes (X-axis, Y-axis, and Z-axis). Accordingly, assuming that the image capturing device 111 captures the $i^{th}$ environmental image at an $i^{th}$ time point, and captures the $(i+1)^{th}$ environmental image at an $(i+1)^{th}$ time point, the processor 113 may obtain the acceleration measured by the head-mounted display 110 between the $i^{th}$ time point and the $(i+1)^{th}$ time point, and then estimate a movement amount of the head-mounted display 110 between the $i^{th}$ time point and the $i^{th}$ time point according to the acceleration of the head-mounted display 110. Therefore, according to the movement amount, the processor 123 may adjust the position of the matching image block obtained based on the $i^{th}$ environmental image, and then adjust the display position of the virtual object. In one embodiment, the processor 123 may use a Kalman filter to estimate the coordinates of the four corner points of the matching image block of the component device 131. Accordingly, with the assistance of the motion sensor 113, the virtual object can be displayed more smoothly.

Figure 6:
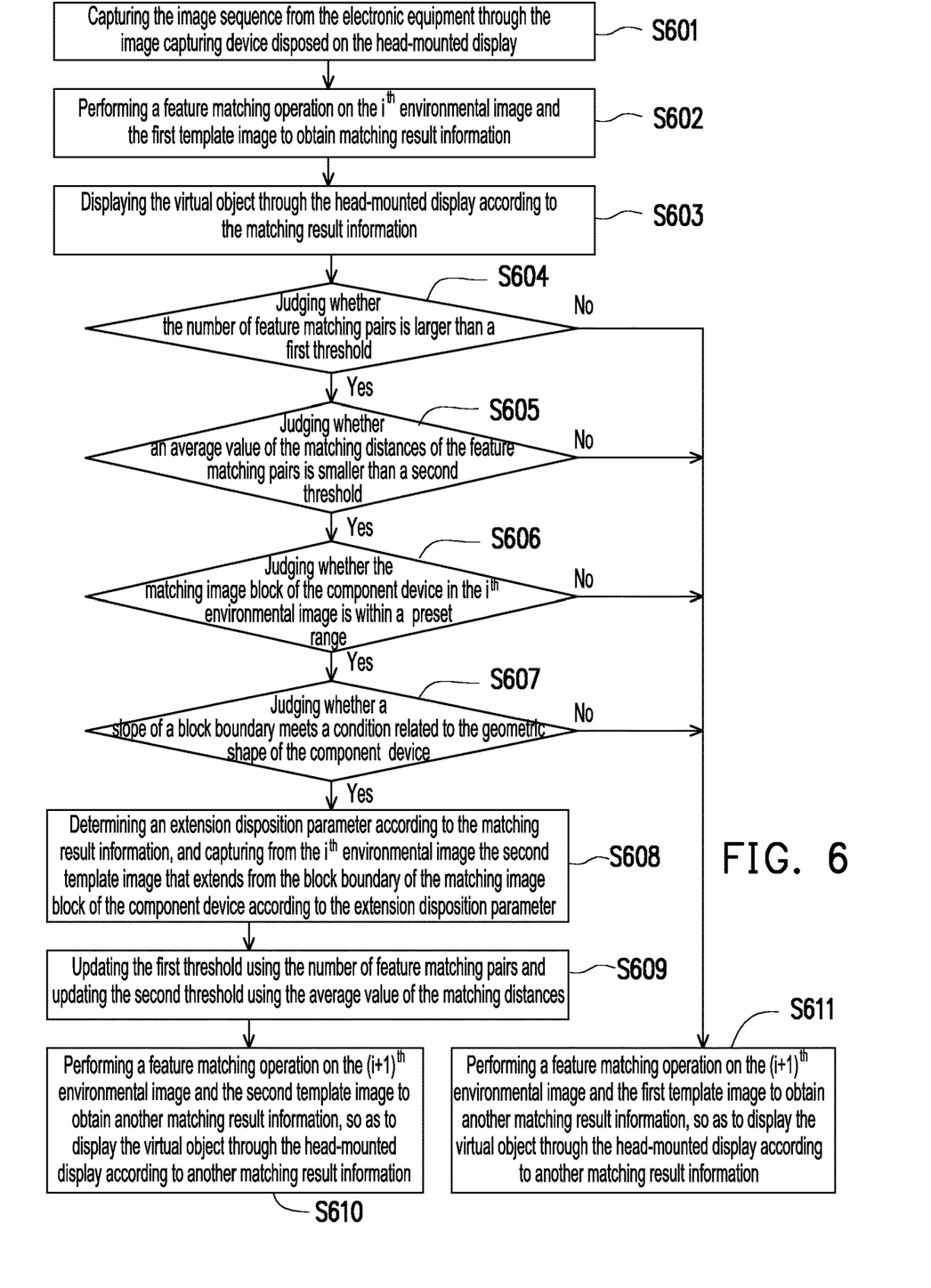
FIG. 6 is a flowchart of a display method for anchoring a virtual object according to one embodiment of the disclosure.

FIG. 6 is a flowchart of a display method for anchoring a virtual object according to one embodiment of the disclosure. Please refer to FIG. 1 and FIG. 6. The method of the present embodiment is applicable to the augmented reality system 10 in the above-mentioned embodiments. The following uses various components of the augmented reality system 10 to describe the detailed steps of the display method for anchoring the virtual object according to the present embodiment.

In step S601, the image sequence is captured from the electronic equipment 130 through the image capturing device 111 disposed on the head-mounted display 110. In step S602, the processor 123 performs a feature matching operation on the $i^{th}$ environmental image and the first template image to obtain the matching result. The operation principle of step S601 to step S602 is similar to the operation principle of step S301 to step S302 of the above-mentioned embodiments, and will not be repeated here.

In step S603, the processor 123 displays the virtual object through the head-mounted display 110 according to the matching result. That is, the processor 123 may determine the display position of the virtual object according to the position of the matching image block of the component device 131 of the $i^{th}$ environmental image, so as to control the head-mounted display 110 to display the virtual object according to the display position.

It should be noted that, in one embodiment, the matching result between the $i^{th}$ environmental image and the first template image may include the multiple feature matching pairs and the matching image block of the component device 131 of the $i^{th}$ environmental image. Based on the feature matching operations, the feature matching pair is formed by an image feature of the $i^{th}$ environmental image and an image feature of the first template image; each feature matching pair is provided with a corresponding matching distance. Specifically, after running a feature matching algorithm, the processor 123 may obtain the multiple feature matching pairs and the matching distance of each feature matching pair. The matching distance may reflect the degree of similarity between two image features of the feature matching pair, and is the distance between the descriptors of the two image features in a vector space.

In step S604, the processor 123 judges whether the number of the feature matching pairs is larger than a first threshold. The number of the feature matching pairs may reflect the degree of similarity between the $i^{th}$ environmental image and the first template image, and the number of the feature matching pairs may also reflect whether the image features of the first template image are sufficient. In step S605, the processor 123 judges whether an average value of the matching distances of the feature matching pairs is smaller than a second threshold. The average value of the matching distances of the feature matching pairs may reflect the degree of similarity between the $i^{th}$ environmental image and the first template image, and may also reflect the accuracy of the feature matching. The smaller the average value of the matching distance of the feature matching pairs, the higher the accuracy of feature matching.

In step S606, the processor 123 judges whether the matching image block of the component device 131 of the $i^{th}$ environmental image is within a preset range. Taking FIG. 5 as an example, the processor 123 may judge whether the center point position P1 of the matching image block M2 is within a specific center range of the $i^{th}$ environmental image; the specific center range may be set according to actual requirements. For example, assuming that an image size of the $i^{th}$ environmental image is M*N, the processor 123 may judge whether an X component of the center point position P1 of the matching image block M2 is between 0.25*M and 0.75*M, and whether a Y component of the center point position P1 of the matching image block M2 is between 0.25*N and 0.75*N. If the X component and the Y component of the center point position P1 of the matching image block M2 meet the above conditions, the processor 123 may determine that the matching image block of the component device 131 of the $i^{th}$ environmental image is within the preset range.

In one embodiment, if the number of the feature matching pairs is larger than the first threshold; the average value of the matching distances of the feature matching pairs is smaller than the second threshold; and the matching image block is within the preset range, then the processor 123 may capture from the $i^{th}$ environmental image the second template image that extends from the matching image block of the component device 131. In one embodiment, the second template image is a part of the $i^{th}$ environmental image.

In the embodiment of FIG. 6, the processor 123 may further determine whether to capture the second template image from the $i^{th}$ environmental image according to a geometric shape of the matching image block. Thus, in step S607, the processor 123 judges whether slopes of the block boundaries meet a condition related to the geometric shape of the component device 131. Specifically, the matching image block of the component device 131 of the $i^{th}$ environmental image includes the multiple block boundaries, for example, four block boundaries. In one embodiment, assuming that the component device 131 is a rectangular display screen, the geometric shape of the matching image block should be a trapezoid. In this case, the processor 123 may judge the correctness of the matching image block according to the slopes of the block boundaries. If the slopes of the block boundaries do not meet the condition related to the geometric shape of the component device 131, it represents deficiency as a result of the feature matching, and it is known that it is not suitable to capture the second template image from the $i^{th}$ environmental image. If the slopes of the block boundaries meet the condition related to the geometric shape of the component device 131, the processor 123 captures from the $i^{th}$ environmental image the second template image that extends from the matching image block of the component device 131.

For example, the matching image block of the component device 131 of the $i^{th}$ environmental image includes a first block boundary, a second block boundary relative to the first block boundary, a third block boundary, and a fourth block boundary relative to the third block boundary. It is assumed that the component device 131 is a rectangular display screen. Therefore, only if an absolute value of a slope of the first block boundary is similar to an absolute value of a slope of the second block boundary, and an absolute value of a slope of the third block boundary is similar to an absolute value of a slope of the fourth block boundary, then the processor 123 may capture from the $i^{th}$ environmental image the second template image that extends from the matching image block of the component device 131.

Therefore, if steps S604, S605, S606, and S607 are all judged to be "yes", the processor 123 may decide to capture the second template image from the $i^{th}$ environmental image. On the other hand, if any one of the steps S604, S605, S606, and S607 is judged to be "no", then the processor 123 does not update the template image configured to position the component device 131. Thus, in step S611, the processor 123 may perform a feature matching operation on the $(i+1)^{th}$ environmental image and the first template image to obtain another matching result, so as to display the virtual object through the head-mounted display 110 according to the another matching result.

In the present embodiment, when steps S604, S605, S606, and S607 are all judged to be "yes", in step S608, the processor 123 may determine an extension disposition parameter according to the matching result between the $i^{th}$ environmental image and the first template image, and, according to the extension disposition parameter, capture from the $i^{th}$ environmental the second template image that extends from the block boundaries of the matching image block of the component device 131. In one embodiment, the processor 123 may determine the extension disposition parameter according to the distribution of the feature matching pairs. In one embodiment, the extension disposition parameter may include extension direction and extension amount. For example, the extension disposition parameter may include four extension amounts corresponding to the positive and negative directions of the X axis and of the Y axis, and the above extension amounts may be determined based on the matching result. If the left side of the component device 131 of the $i^{th}$ environmental image has more image features that are successfully matched, then the processor 123 may be disposed such that the extension amount corresponding to the negative direction of the X axis is larger than the extension amount corresponding to the positive direction of the X axis. Thus, the processor 123 generates the template image according to the dynamically changed extension disposition parameter, so the processor 123 may capture the second template image with richer image features from the $i^{th}$ environmental image.

Furthermore, in one embodiment, the processor 123 may gradually expand a size of the template image until the size of the template image meets the preset size. Therefore, in one embodiment, the processor 123 judges whether the image size of the first template image meets a preset size. In response to the image size of the first template image meeting the preset size, based on the preset size, the processor 123 captures from the $i^{th}$ environmental image the second template image that extends from matching image block of the component device 131. In this case, the size of the first template image and the size of the second template image both equal to the preset size. On the other hand, in response to the image size of the first template image not meeting the preset size, based on a temporary extension size, the processor 123 captures from the $i^{th}$ environmental image the second template image that extends from the matching image block of the component device 131. In this case, the size of the first template image is smaller than the temporary extension size and the size of the second template image equals to the temporary extension size, where the temporary extension size is smaller than the preset size.

In step S609, if the number of the feature matching pairs is larger than the first threshold and an average value of similarity distances of the feature matching pairs is smaller than the second threshold, then the processor 123 updates the first threshold using the number of the feature matching pairs and updates the second threshold using the average value of the matching distances. By continuously updating the first threshold and the second threshold in an operation scenario, the first threshold may approach a specific maximum value and the second threshold may approach a specific minimum value, so as to obtain the first threshold and the second threshold suitable for a current operation scenario.

Then, in step S610, the processor 123 performs a feature matching operation on the $(i+1)^{th}$ environmental image and the second template image to obtain another matching result, so as to display the virtual object through the head-mounted display 110 according to the another matching result.

In summary, in the embodiments of the disclosure, when the user wears the head-mounted display to view the electronic equipment, even if the head-mounted display moves dynamically, the user can still see the virtual object anchored in a fixed position in the real scene. In this way, the user can obtain more information through the virtual object and enjoy an excellent and comfortable viewing experience. In addition, since the template image configured to position the component device of the electronic equipment may dynamically change with the scene content, the reliability and robustness of the feature matching can be greatly improved, and the virtual object can be displayed more smoothly and accurately. In this way, the user's viewing experience using the head-mounted display to view the virtual object can be improved.

Although the disclosure has been disclosed in the above embodiments, it is not intended to limit the disclosure. Anyone with ordinary knowledge in the relevant technical field can make some modifications and variations without departing from the spirit and scope of the disclosure. Therefore, the scope of protection of the disclosure shall be subject to those defined by the following claims.

What is claimed is:

1. A display method for anchoring a virtual object of an augmented reality system, the method comprising:
   capturing an image sequence from an electronic equipment through an image capturing device disposed on a head-mounted display, wherein the image sequence comprises an environmental image and an $(i+1)^{th}$ environmental image, and the electronic equipment comprises a component device, wherein i is an integer larger than 0, $i^{th}$ is the integer number for environmental images, and the $(i+1)^{th}$ is an integer number immediately after the $i^{th}$ environmental image in the sequence of images;
   performing a feature matching operation on the $i^{th}$ environmental image and a first template image to obtain a matching result, wherein the first template image comprises an image of the component device;
   in response to the matching result meeting a preset condition, capturing from the $i^{th}$ environmental image a second template image that extends from a matching image block of the component device, wherein the first template image is different from the second template image; and
   performing a feature matching operation on the $(i+1)^{th}$ environmental image and the second template image to obtain another matching result, so as to display the virtual object through the head-mounted display according to the another matching result, wherein the virtual object is displayed as being anchored to the electronic equipment in a real scene.

2. The display method for anchoring the virtual object according to claim 1, wherein the matching result between the $i^{th}$ environmental image and the first template image comprises a plurality of feature matching pairs and the matching image block of the component device of the $i^{th}$ environmental image, and wherein, in response to the matching result meeting the preset condition, a step of capturing from the $i^{th}$ environmental image the second template image that extends from the matching image block of the component device comprises:
   judging whether a number of the feature matching pairs is larger than a first threshold;
   judging whether an average value of matching distances of the feature matching pairs is smaller than a second threshold;
   judging whether the matching image block of the component device of the $i^{th}$ environmental image is within a preset range; and
   if the number of the feature matching pairs is larger than the first threshold, the average value of the matching distances of the feature matching pairs is smaller than the second threshold, and the matching image block is within the preset range, capturing from the $i^{th}$ environmental image the second template image that extends from the matching image block of the component device.

3. The display method for anchoring the virtual object according to claim 2, wherein the matching image block of the component device of the $i^{th}$ environmental image comprises a plurality of block boundaries, and wherein, in response to the matching result meeting the preset condition, the step of capturing from the $i^{th}$ environmental image the second template image that extends from the matching image block of the component device further comprises:
   judging whether slopes of the block boundaries meet a condition related to a geometric shape of the component device; and
   if the slopes of the block boundaries meet the condition related to the geometric shape of the component device, capturing from the $i^{th}$ environmental image the second template image that extends from the matching image block of the component device.

4. The display method for anchoring the virtual object according to claim 2, wherein, in response to the matching result meeting the preset condition, after the step of capturing from the $i^{th}$ environmental image the second template image that extends from the matching block image block of the component device, the method further comprises:
   if the number of the feature matching pairs is larger than the first threshold, and an average value of similarity distances of the feature matching pairs is small than the second threshold, updating the first threshold using the number of the feature matching pairs and updating the second threshold using the average value.

5. The display method for anchoring the virtual object according to claim 1, wherein the step of capturing from the $i^{th}$ environmental image the second template image that extends from the matching image block associated with the component device comprises:
   determining an extension disposition parameter according to the matching result, and, according to the extension disposition parameter, capturing from the $i^{th}$ environmental image the second template image that extends from block boundaries of the matching image block of the component device, wherein the extension disposition parameter comprises extension direction and extension amount.

6. The display method for anchoring the virtual object according to claim 5, wherein the step of determining the extension disposition parameter according to the matching result comprises:
   determine the extension amount of the extension disposition parameter according to distribution of feature matching pairs of the matching result.

7. The display method for anchoring the virtual object according to claim 5, wherein a step of determining the extension disposition parameter according to the matching result and of capturing from the $i^{th}$ environmental image the second template image that extends from the block boundaries of the matching image block of the component device according to the extension disposition parameter further comprises:
   judging whether an image size of the first template image meets a preset size;
   in response to the image size of the first template image meeting the preset size, based on the preset size, capturing from the $i^{th}$ environmental image the second template image that extends from the matching image block of the component device; and in response to the image size of the first template image not meeting the preset size, based on a temporary extension size, capturing from the $i^{th}$ environmental image the second template image that extends from the matching image block of the component device, wherein the temporary extension size is smaller than the preset size.

8. The display method for anchoring the virtual object according to claim 1, wherein the component device is a keyboard or a display screen, and wherein a step of displaying the virtual object at a current time point through the head-mounted display according to the another matching result comprises:
  obtaining from the $(i+1)^{th}$ environmental image another matching image block of the component device;
  determining a display position of the virtual object according to an image coordinate of the another matching image block; and
  displaying the virtual object through the head-mounted display according to the display position.

9. The display method for anchoring the virtual object according to claim 1, the method further comprising:
  storing a plurality of original template images, wherein the first template image is one of the original template images; and
  respectively performing the feature matching operations on the $i^{th}$ environmental image and the original template images to select the first template image from the original template images.

10. The display method for anchoring the virtual object according to claim 1, the method further comprising:
  sensing an acceleration of the head-mounted display through a motion sensor before the image capturing device captures the $(i+1)^{th}$ environmental image;
  estimating a movement amount of the head-mounted display according to the acceleration of the head-mounted display;
  adjusting a position of the matching image block of the $i^{th}$ environmental image according to the movement amount to adjust a display position of the virtual object.

11. An augmented reality system, comprising:
  a head-mounted display comprising an image capturing device, and displaying a virtual object, wherein the image captures from an electronic equipment device an image sequence, the image sequence comprises an $i^{th}$ environmental image and an $(i+1)^{th}$ environmental image, and the electronic equipment comprises a component device, wherein i is an integer larger than 0, $i^{th}$ is the integer number for environmental images, and the $(i+1)^{th}$ is an integer number immediately after the $i^{th}$ environmental image in the sequence of images; and
  a computer device, connected to the head-mounted display, and comprising:
    a storage device; and
    a processor, coupled to the storage device, configured to:
      perform a feature matching operation on the $i^{th}$ environmental image and a first template image to obtain a matching result, wherein the first template image comprises an image of the component device;
      in response to the matching result meeting a preset condition, capture from the $i^{th}$ environmental image a second template image that extends from a matching image block of the component device, wherein the first template image is different from the second template image; and
      perform the feature matching operation on the $(i+1)^{th}$ environmental image and the second template image to obtain another matching result, so as to control the head-mounted display according to the another matching result to display the virtual object, wherein the virtual object is displayed as being anchored to the electronic equipment in a real scene.

12. The augmented reality system according to claim 11, wherein the matching result between the $i^{th}$ environmental image and the first template image comprises a plurality of feature matching pairs and the matching image block of the component device of the $i^{th}$ environmental image, and wherein the processor is further configured to:
  judge whether a number of the feature matching pairs is larger than a first threshold;
  judge whether an average value of matching distances of the feature matching pairs is smaller than a second threshold;
  judge whether the matching image block of the component device of the $i^{th}$ environmental image is within a preset range; and
  if the number of the feature matching pairs is larger than the first threshold, the average value of the feature matching pairs is smaller than the second threshold, and the matching image block is within the preset range, capture from the $i^{th}$ environmental image the second template image that extends from the matching image block of the component device.

13. The augmented reality system according to claim 12, wherein the matching image block of the component device of the $i^{th}$ environmental image comprises a plurality of block boundaries, and wherein the processor is further configured to:
  judge whether slopes of the block boundaries meet a condition related to a geometric shape of the component device; and
  if the slopes of the block boundaries meet the condition related to the geometric shape of the component device, capture from the $i^{th}$ environmental image the second template image that extends from the matching image block of the component device.

14. The augmented reality system according to claim 12, wherein the processor is further configured to:
  if the number of the feature matching pairs is larger than the first threshold, and an average value of similarity distances of the feature matching pairs is small than the second threshold, update the first threshold using the number of the feature matching pairs and update the second threshold using the average value.

15. The augmented reality system according to claim 11, wherein the processor is further configured to:
  determine an extension disposition parameter according to the matching result, and, according to the extension disposition parameter, capture from the $i^{th}$ environmental image the second template image that extends from block boundaries of the matching image block of the component device, wherein the extension disposition parameter comprises extension direction and extension amount.

16. The augmented reality system according to claim 15, wherein the processor is further configured to:
  determine the extension amount of the extension disposition parameter according to distribution of feature matching pairs of the matching result.

17. The augmented reality system according to claim 15, wherein the processor is further configured to:

judge whether an image size of the first template image meets a preset size;

in response to the image size of the first template image meeting the preset size, based on the preset size, capture from the $i^{th}$ environmental image the second template image that extends from the matching image block of the component device; and in response to the image size of the first template image not meeting the preset size, based on a temporary extension size, capture from the $i^{th}$ environmental image the second template image that extends from the matching image block of the component device, wherein the temporary extension size is smaller than the preset size.

18. The augmented reality system according to claim 11, wherein the component device is a keyboard or a display screen, and wherein the processor is further configured to:

obtain from the $(i+1)^{th}$ environmental image another matching image block of the component device;

determine a display position of the virtual object according to an image coordinate of the another matching image block; and display the virtual object through the head-mounted display according to the display position.

19. The augmented reality system according to claim 11, wherein the processor is further configured to:

store a plurality of original template images, wherein the first template image is one of the original template images; and respectively perform the feature matching operations on the $i^{th}$ environmental image and the original template images to select the first template image from the original template images.

20. The augmented reality system according to claim 11, the processor is further configured to:

obtain an acceleration of the head-mounted display through a motion sensor before the image capturing device captures the $(i+1)^{th}$ environmental image;

estimate a movement amount of the head-mounted display according to the acceleration of the head-mounted display;

adjust a position of the matching image block of the $i^{th}$ environmental image according to the movement amount to adjust a display position of the virtual object.

* * * * *